(12) United States Patent
Anderson et al.

(10) Patent No.: US 8,935,486 B2
(45) Date of Patent: Jan. 13, 2015

(54) MEMORY ACCESS FOR DIGITAL SIGNAL PROCESSING

(75) Inventors: Adrian John Anderson, Chepstow (GB); Gary Christopher Wass, St Albans (GB)

(73) Assignee: Imagination Technologies, Limited, Kings Langley (GB)

( * ) Notice: Subject to any disclaimer, the term of this patent is extended or adjusted under 35 U.S.C. 154(b) by 148 days.

(21) Appl. No.: 13/563,204

(22) Filed: Jul. 31, 2012

(65) Prior Publication Data

US 2013/0191604 A1    Jul. 25, 2013

(30) Foreign Application Priority Data

Nov. 9, 2011    (GB) .................................. 1119327.3

(51) Int. Cl.
*G06F 13/16*    (2006.01)
*G06F 9/52*    (2006.01)

(52) U.S. Cl.
CPC .............. *G06F 13/1663* (2013.01); *G06F 9/52* (2013.01); *G06F 13/1657* (2013.01)
USPC .......................................... 711/149; 711/150

(58) Field of Classification Search
CPC .............................. G06F 13/1657; G06F 9/52
USPC ................................................. 711/149, 150
See application file for complete search history.

(56) References Cited

U.S. PATENT DOCUMENTS

| 4,051,551 | A | 9/1977 | Lawrie et al. |
| 4,334,285 | A | 6/1982 | Kawakita et al. |
| 5,479,624 | A * | 12/1995 | Lee ................................... 711/1 |
| 7,685,354 | B1 | 3/2010 | Hetherington et al. |
| 2011/0035529 | A1 | 2/2011 | Wang et al. |

OTHER PUBLICATIONS

Computer Architecture News, May 1993, Seznec et al, Odd memory systems may be quite interesting, pp. 341-350.
Proceedings of 1993 IEEE International Conference on Computer Design ICCD'93, Oct. 3-6, 1993, IEEE Comput. Society Press, Chiueh, A vector memory system based on wafer-scale integrated memory arrays, pp. 284-288.
Proceedings of the 1980 international Conference on Parallel Processing, 1980, IEEE, Lawrie et al, The prime memory system for array access, pp. 81-87.
Search report in GB1119327.3.
EP12191503.7 EESR Issued Feb. 1, 2013.

\* cited by examiner

*Primary Examiner* — Than Nguyen
(74) *Attorney, Agent, or Firm* — Vorys, Sater, Seymour and Pease LLP; Vincent M DeLuca (57) ABSTRACT

Memory access in a digital signal processing system is described. In one example, the digital signal processing system comprises a multi-port memory that is constructed from a memory interface connected to a number of single-port memory devices. The memory interface provides access ports that processors can use to access data stored on the single-port memory devices using a single address space. A processor can be connected to several access ports, and use these to request access to data at several different memory addresses at the same time. The digital signal processing system is configured such that the total number of single-port memory devices connected to the memory interface is a prime number greater than or equal to three. Because a prime number of memory devices are used, the likelihood of the data for the different memory addresses being on the same single-port memory device is minimised, increasing memory access speed.

18 Claims, 5 Drawing Sheets

MEMORY ACCESS FOR DIGITAL SIGNAL PROCESSING

This application claims priority priority to GB App. No. 1119327.3, filed on Nov. 9, 2011, entitled "MEMORY ACCESS FOR DIGITAL SIGNAL PROCESSING", which is incorporated by reference in its entirety herein, for all purposes.

BACKGROUND

Digital signal processing is used in a wide variety of applications. Many of these applications are real-time in the sense that time constraints exist on the processing of the data in order for it to be meaningful or useful to an end user. An example of this is digital broadcast streams, such as digital television and digital radio. The digital signal processing system needs to be capable of processing and decoding the real-time streams rapidly enough to enable the data to be output as quickly as it is received (barring buffering).

Digital signal processing systems may utilise a plurality of different types of processing elements. For example, such a system can comprise digital signal processors (DSPs), general purpose processors, and specialised hardware peripherals designed to perform a specific signal processing task. Each of these different types of processing elements may utilise one or more memory devices for storing data and/or software code.

For demanding applications, such as real-time data, speed of memory access is a critical factor in the performance of the overall digital signal processing system. To enable fast memory access, the memory devices can be tailored to operate efficiently with the type of data being processed. For example, a particular processing element can be connected to a dedicated memory device that enables fast memory access for that element for a specific type or structure of data.

However, the use of dedicated and specialised memory devices limits the ability of the digital signal processing system to be flexible and configurable to different types of real-time data. For example, the various different digital television and radio standards used around the world often have the real-time data structured differently. It is therefore difficult to provide a digital signal processing system that provides fast memory access for each of these different types of data, without constructing a different digital signal processing system for each data type.

The embodiments described below are not limited to implementations which solve any or all of the disadvantages of known digital signal processing systems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Memory access in a digital signal processing system is described. In one example, the digital signal processing system comprises a multi-port memory that is constructed from a memory interface connected to a number of single-port memory devices. The memory interface provides access ports that processors can use to access data stored on the single-port memory devices using a single address space. A processor can be connected to several access ports, and use these to request access to data at several different memory addresses at the same time. The digital signal processing system is configured such that the total number of single-port memory devices connected to the memory interface is a prime number greater than or equal to three. Because a prime number of memory devices are used, the likelihood of the data for the different memory addresses being on the same single-port memory device is minimised, increasing memory access speed.

According to one aspect, there is provided a digital signal processing system, comprising: a plurality of single-port memory devices; a memory interface connected to the plurality of single-port memory devices and comprising a plurality of access ports, wherein the memory interface is arranged to provide access to the plurality of single-port memory devices through each access port using a single address space; and a processor having data connections to at least two of the access ports and arranged to access a different memory address from the single address space substantially simultaneously from each of the data connections when executing an operation, wherein the total number of single-port memory devices connected to the memory interface is a prime number greater than or equal to three.

According to another aspect, there is provided a method of accessing data in a digital signal processing system, comprising: receiving a memory access request from a processor at a memory interface, the request comprising a memory address in a single address space; generating, from the memory address: an identifier of one single-port memory device from a plurality of single-port memory devices connected to the memory interface from the memory address; and a second memory address within the one single-port memory device; accessing data located at the second memory address within the one single-port memory, wherein the step of generating comprises performing a division operation using the total number of single-port memory devices connected to the memory interface, and wherein the total number of single-port memory devices connected to the memory interface is a prime number greater than or equal to three.

The methods described herein may be performed by a computer configured with software in machine readable form stored on a tangible storage medium e.g. in the form of a computer program comprising computer program code for configuring a computer to perform the constituent portions of described methods. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

This acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The above features may be combined as appropriate, as would be apparent to a skilled person, and may be combined with any of the aspects of the examples.

BRIEF DESCRIPTION OF THE DRAWINGS

Embodiments will be described, by way of example, with reference to the following drawings, in which.

Common reference numerals are used throughout the figures to indicate similar features.

DETAILED DESCRIPTION

Embodiments are described below by way of example only. These examples represent the best ways of putting the embodiments into practice that are currently known to the Applicant although they are not the only ways in which this could be achieved. The description sets forth the functions of the example and the sequence of steps for constructing and operating the example. However, the same or equivalent functions and sequences may be accomplished by different examples.

Described below is a configurable digital signal processing system that enables the functionality of digital signal processors, general purpose processors, and specialised hardware peripherals to be combined as required to achieve a particular signal processing task. For example, the configurable digital signal processing system can be configured to operate with different types of real-time data standards. It is a common operation in a digital signal processing system for a processing element to operate on data at several different memory addresses at the same time (e.g. with a single instruction). To enable fast memory access for such operations, a multi-port memory device is used, where the processing element has access to several ports of the multi-port memory device. A multi-port memory device aims to enable concurrent access to the memory from the different ports. However, in practice, the multi-port memory device is constructed from a plurality of individual physical single-port memory devices. In this scenario, concurrent access is only possible if the concurrent access requests on different ports relate to different physical single-port memory devices, as otherwise contention occurs.

The design of the multi-port memory device can mitigate contention in the case that the structure of the concurrent memory accesses is known in advance, for example if the spacing between the memory addresses requested concurrently is fixed. However, in the case of a configurable digital signal processing system this is not the case, as different standards may use different memory access structures. To avoid this, the multi-port memory device is constructed from a prime number of physical single-port memory devices. As described below, this minimises the likelihood of contention when different types of multiple-data operations are performed.

The multi-port memory can also be extended, such that it provides a sufficient number of ports to enable all the different processing elements of the system to access the multi-port memory. This enables the configurable digital signal processing system to make use of a common memory space shared by the different processing elements. Without the use of a common memory space, each processing element needs to be provided with its own, dedicated memory. In the case of a configurable digital signal processing system supporting multiple standards, this means that each individual processing element needs to be provided with enough memory for the standard that demands the largest amount of storage for that element. Because the different standards have differing requirements on the memory for each processing element, dimensioning each processing element's memory for the largest-case results in significant amounts of wasted memory (and hence silicon area) for any given standard. The use of a common, shared memory space for the processing elements blends together the differing memory requirements for the processing elements, meaning that the common memory only needs to be sized to accommodate the standard having the largest total memory demands, over all the processing elements.

Figure 1:
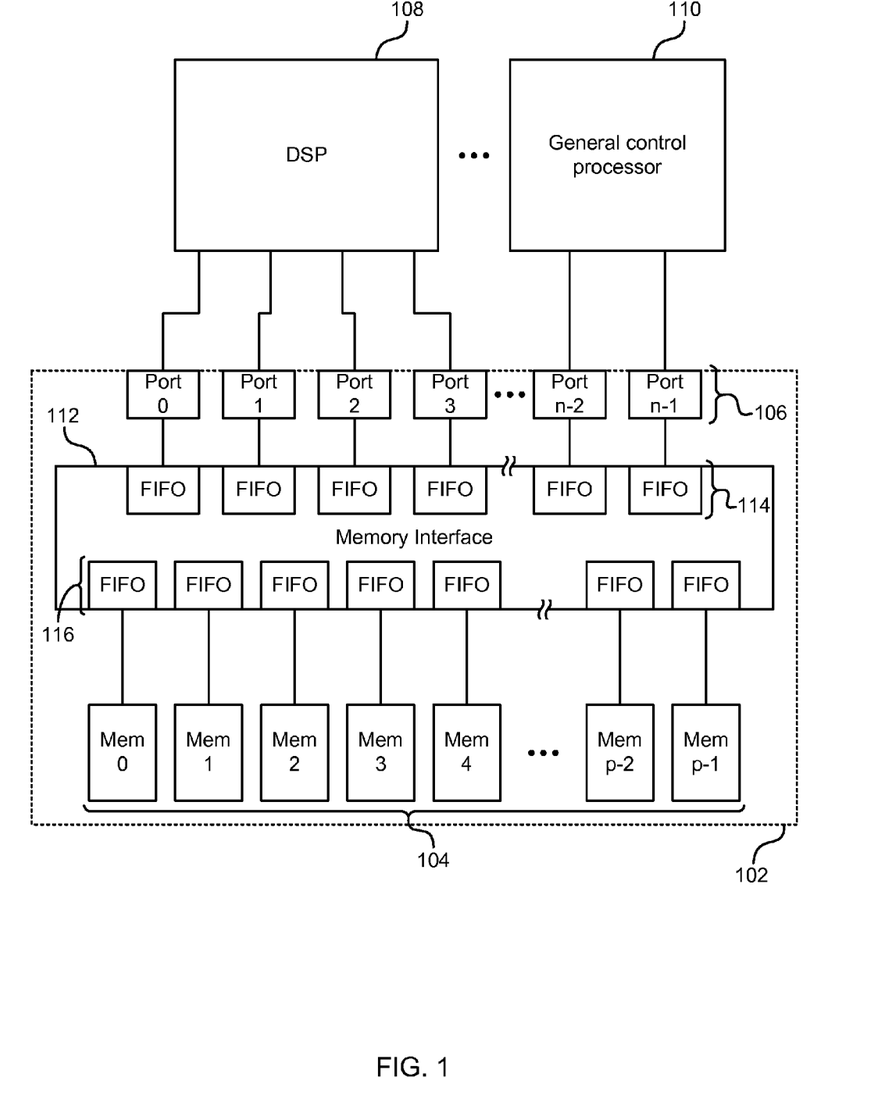
FIG. 1 illustrates a multi-port memory device constructed from a plurality of single-port memory devices.

Reference is first made to FIG. 1, which shows a schematic diagram of a multi-port memory device 102. The multi-port memory device 102 comprises a plurality of single-port memory devices 104. Each of the single-port memory devices 104 is a separate memory device providing one port for accessing the data stored on that memory device. In one example, the single-port memory devices 104 can be physically separate, although may be formed on a common semi-conductor substrate. In alternative examples, they can be formed on separate pieces of silicon. Each of the single-port memory devices 104 can be a random access memory (RAM) of any suitable type, such as (but not limited to) static RAM (SRAM) and dynamic RAM (DRAM), or a writable ROM such as EEPROM and flash memory, or any mixture thereof.

The multi-port memory device 102 provides a plurality of access ports 106, which provide access to the data stored on the multi-port memory device to external devices. For example, various different processing elements of a configurable digital signal processing system can be connected to the ports 106, as described in more detail below with reference to FIG. 5. The example of FIG. 1 shows a DSP 108 connected to four of the ports 106, and a general control processor 110 connected to two of the ports 106. However, this is merely illustrative, and different numbers or types of processing elements can be connected to different numbers of ports.

Note that the number of access ports provided may be different to the number of single-port memory devices. In some examples, the number of access ports provided is less than the number of single-port memory devices. In other examples where some of the ports are used infrequently, the number of access ports provided is greater than the number of single-port memory devices. Also note that a DSP making N accesses every clock cycle can only avoid contention if the number of physical memory devices is greater than or equal to N.

Although the multi-port memory device 102 is constructed from a plurality of separate single port memory devices 104, the total storage space available over all the single port memory devices 104 is presented to external devices at the ports as a single address space. In other words, an external device accessing a port does not know how the total storage space is divided between the single-port memory devices, and all that the external devices see is a single block of memory having contiguous addresses.

The conversion between the single address space and addresses within the individual single-port memory devices is performed by a memory interface 112. The memory interface 112 acts as an interface between the plurality of access ports 106 and the plurality of single-port memory devices 104. The memory interface 112 is configured to manage requests (reading or writing of data) received at the access ports 106, determine which single-port memory device a request relates to, and provide access to the data in that single-port memory device. The memory interface 112 can also be referred to as a crossbar as it allows any single-port memory device 104 to be accessed from any port 106.

The multi-port memory device 102 is configured to provide substantially concurrent access to the data stored on the single-port memory devices 104 independently through each of the access ports 106. In other words, whenever possible, requests received at two (or more) different access ports at the same time can be served at the same time. However, this can only be achieved if the access requests on the different ports relate to different single-port memory devices.

For example, with reference to FIG. 1, if an access request is received on "port 0" which relates to data that is stored on "Mem 2" and concurrently with this (i.e. in the same clock cycle) an access request is received on "port 2" which relates to data that is stored on "Mem 3", then the memory interface 112 can serve both of these requests at the same time. This is because the data can be read from (or written to, as appropriate) the separate single-port memory devices independently. However, if the access request from "port 2" above also related to data that is stored on "Mem 2", then contention occurs. This is because an individual single-port memory device can only provide access to a single memory address within it at each clock cycle. Therefore, if two requests are received at the same time relating to one single-port memory device, then one of the requests must wait for the other to complete first, before it can be served.

The memory interface 112 comprises a plurality of port buffers 114, such that each access port has an associated port buffer. The port buffers 114 queue requests at their respective ports. Similarly, the memory interface 112 also comprises a plurality of memory device buffers 116, such that each single-port memory device has an associated buffer. The memory device buffers 116 queue requests pending for their respective single-port memory devices. In some examples, the port buffers 114 and memory device buffers 116 can be in the form of first-in first-out (FIFO) buffers. The use of FIFO buffers ensures that requests are served in the order that they are received at the access ports. The FIFO buffers allow requests to be queued when contention occurs.

When the multi-port memory device illustrated in FIG. 1 is used in a digital signal processing system, many operations performed on the data stored in the memory device involve multiple concurrent memory access requests. For example, the DSP devices (such as DSP 108) can be single-instruction, multiple-data (SIMD) processors. SIMD processors are configured to efficiently perform the same operation on multiple data items simultaneously. Examples of the type of operation performed by an SIMD processor include a fast-fourier transform (FFT) and multi-rate filtering. To perform these operations as efficiently as possible, the SIMD processor needs to access data at different memory addresses at the same time. The multi-port memory device 102 enables this by providing a port for each of the multiple data items.

For example, as shown in FIG. 1, DSP 108 (which can be a SIMD processor) is connected to four of the access ports 106. This enables the DSP 108 to issue four memory access requests at the same time, each to a different port, for example for use in an SIMD operation on four data items. If no contention occurs, then the DSP 108 can have all four requests served simultaneously, enabling the operation to be performed without delay. However, if contention does occur, then the operation is delayed whilst the memory access contention is resolved. Therefore, the speed at which the operation is performed is dependent on whether the different memory access requests received on the different ports relate to the same or different individual single-port memory devices.

The likelihood of contention occurring is related to the number of single-port memory devices 104 that are used to make up the multi-port memory. One option is to have a total number of single-port memory devices that is a power of two. This may be done as this gives a very simple address conversion between the single address space and the addresses of the individual single-port memory devices. This is illustrated with reference to FIG. 2.

Figure 2:
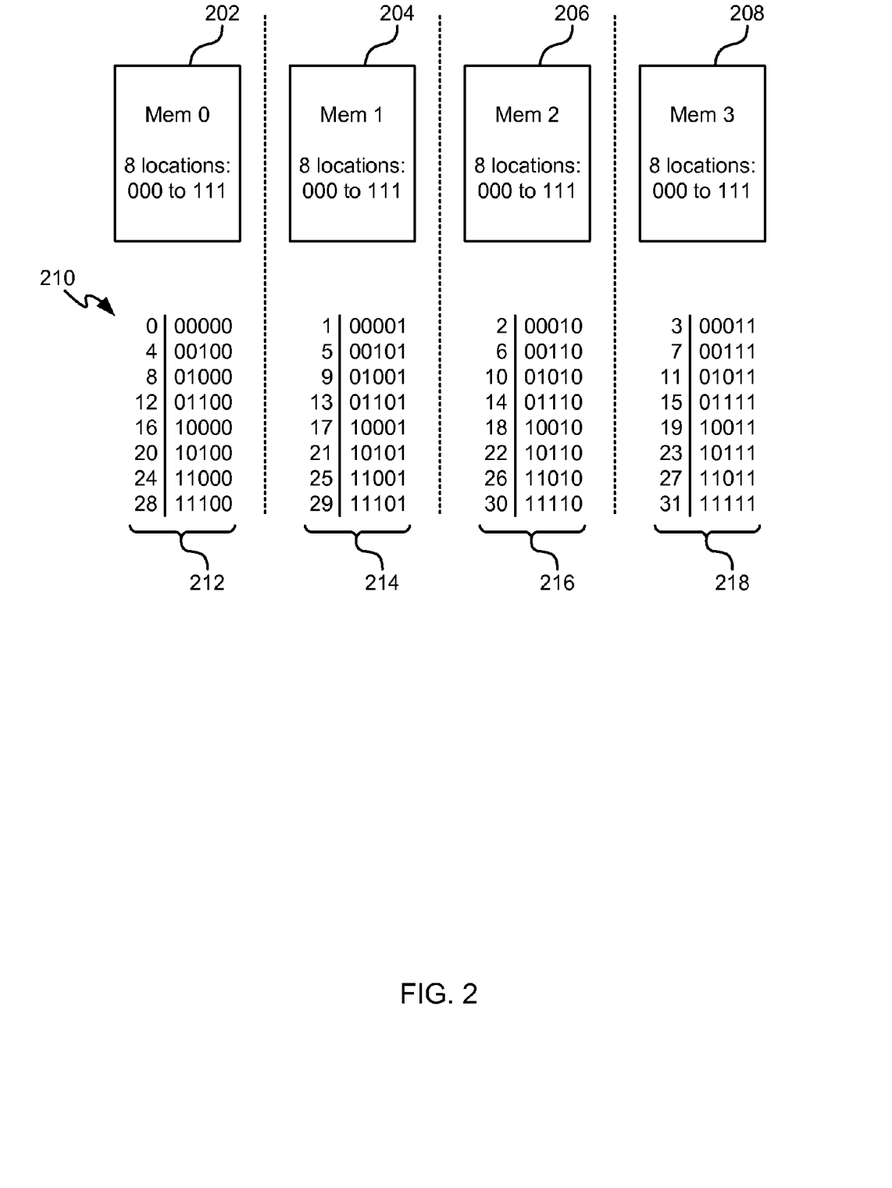
FIG. 2 illustrates an addressing scheme for a multi-port memory constructed from a number of single-port memory devices, where the number is a power of two.

FIG. 2 shows an example of a multi-port memory made up of a total of four single-port memory devices (i.e. a total number that is a power of two) denoted Mem 0 202, Mem 1 204, Mem 2 206, and Mem 3 208. In this illustrative example, each single-port memory holds 8 locations (clearly a real system has much larger memories, but this example is used here for brevity). This gives a total storage capacity for the multi-port memory device of 4×8=32 locations. The 8 locations within each single-port memory device are consecutively addressed from 0 (000 in binary) to 7 (111 in binary).

The memory interface 112 is arranged to provide the single address space such that the consecutive addresses are located on each single-port memory in turn, and wrap back to the first memory at the end of each row. In other words, location 0 is held in Mem 0 202, location 1 is held on Mem 1 204, location 2 is held on Mem 2 206, location 3 is held on Mem 3 208, location 4 returns to Mem 0 202, and so on.

Below the four single-port memory devices in FIG. 2 is shown the single address space 210 for the multi-port memory. This is split into columns, wherein each column reflects which single-port memory those addresses relate to. For example, addresses 0, 4, 8, 12, 16, 20, 24, 28 in column 212 relate to Mem 0 202, addresses 1, 5, 9, 13, 17, 21, 25, 29 in column 214 relate to Mem 1 204, addresses 2, 6, 10, 14, 18, 22, 26, 30 in column 216 relate to Mem 2 206, and addresses 3, 7, 11, 15, 19, 23, 27, 31 in column 218 relate to Mem 3 208. The columns show both the decimal memory address in the single address space, and its binary equivalent.

It can therefore be seen that, for example, memory address 14 in the single address space relates to Mem 2 206 (as it is in column 216), and is at memory address 3 within Mem 2 206 (counting down the column 216 starting from zero). By using a total number of single-port memory devices that is a power of two, this calculation is performed very simply directly from the binary addresses. For example, memory address 14 in the single address space is 01110 in binary. The identity of the single-port memory to which this relates can be determined by reading the two least significant address bits (10 in binary=2 in decimal). The memory address within this single-port memory can be determined by reading the three most significant address bits (011 in binary=3 in decimal).

Therefore, the use of a total number of single-port memory devices that is a power of two provides a very simple address conversion scheme. However, the use of a power of two for the number of single-port memory devices can result in significant contention, as outlined below.

When multiple simultaneous requests are received from an SIMD processor, there is typically a fixed relationship between the memory addresses in the requests. For example, the memory addresses are often regularly spaced apart according to some predefined relationship. For example, the SIMD processor may make K simultaneous requests at different memory addresses that are spaced apart by M memory locations, in which case the relationship is:

$$\text{Address}(k) = \text{base} + k \times M \ (k=0 \text{ to } K-1)$$

where Address(k) is the memory address in the single address space for request k, and base is the starting address in the single address space. The spacing between addresses, M, can take any value and can depend upon the operation being performed. However, typically, this can take the value of 1, or a power of two (commonly seen in FFT operations) or a small integer value (commonly seen in multi-rate filtering operations).

If the spacing M between memory addresses is 1, then the structure shown in FIG. 2 works well if four (or fewer) simultaneous access requests are made. For example, if the base starting address is 9 and M=1, then with four requests (K=4) the requested addresses are 9, 10, 11 and 12. Each of these is located on a different single-port memory device, and hence these can all be served simultaneously without contention.

However, if the spacing M between memory addresses is a power of two, then the structure shown in FIG. 2 results in significant contention. For example, if the base starting address is again 9 and M=2, then with four requests (K=4) the requested addresses are 9, 11, 13 and 15. Both addresses 9 and 13 are located on the same single-port memory (as shown in column 214), as are addresses 11 and 15 (as shown in column 218). This results in contention for both Mem 1 204 and Mem 3 208, meaning that more than one cycle is needed to serve the access request. The situation is even worse for higher powers of two, such as 4, 8 and 16, as these result in the same single-port memory device holding all of the requested addresses, further increasing the contention delay.

Therefore, as shown above, the use of a power of two for the number of single-port memory devices gives simple addressing, but has issues with contention with certain spacing between addresses. If the address spacing is known in advance and fixed (e.g. at 1 as illustrated above), then the structure shown in FIG. 2 can work effectively. However, in the case of a configurable digital signal processing system that is able to be used with a variety of different types of operations and data, then the address spacing is not fixed and known in advance. This means that contention can occur frequently, particularly because a spacing M of a power of two is very common for various DSP processing operations, e.g. for FFT operations.

Figure 3:
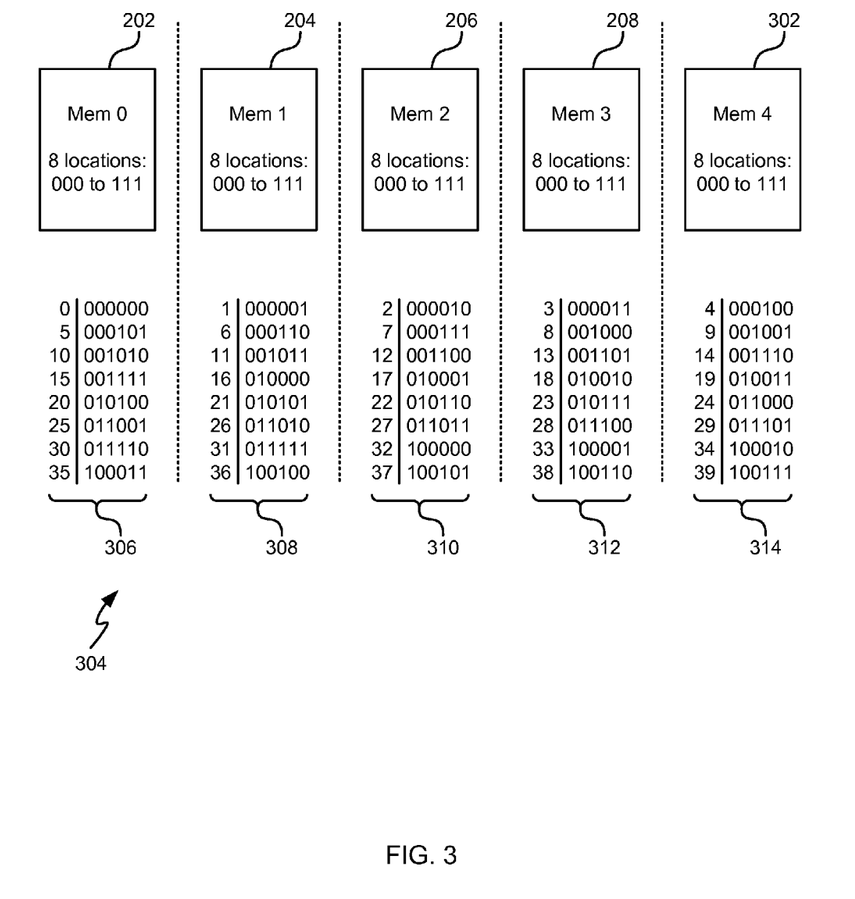
FIG. 3 illustrates an addressing scheme for a multi-port memory constructed from a prime number of single-port memory devices.

Reference is now made to FIG. 3, which illustrates an example of a multi-port memory made up of a prime number of single-port memory devices. In this particular example, there are five single-port memory devices, but any prime number greater than or equal to three can be used.

The five single-port memory devices are denoted Mem 0 202, Mem 1 204, Mem 2 206, Mem 3 208, and Mem 4 302. Again in this illustrative example, each single-port memory holds 8 locations, which gives a total storage capacity for the multi-port memory device of 5×8=40 locations. The 8 locations within each single-port memory device are again consecutively addressed from 0 (000 in binary) to 7 (111 in binary).

Below the five single-port memory devices in FIG. 3 is shown the single address space 304 for the multi-port memory. This is split into columns, wherein each column reflects which single-port memory those addresses relate to. For example, addresses 0, 5, 10, 15, 20, 25, 30, 35 in column 306 relate to Mem 0 202, addresses 1, 6, 11, 16, 21, 26, 31, 36 in column 308 relate to Mem 1 204, addresses 2, 7, 12, 17, 22, 27, 32, 37 in column 310 relate to Mem 2 206, addresses 3, 8, 13, 18, 23, 28, 33, 38 in column 312 relate to Mem 3 208, and addresses 4, 9, 14, 19, 24, 29, 34, 39 in column 314 relate to Mem 4 302. The columns show both the decimal memory address in the single address space, and its binary equivalent. It can therefore be seen that, for example, memory address 14 in the single address space relates to Mem 4 302 (as it is in column 314), and is at memory address 2 within Mem 4 302 (counting down the column 314 starting from zero).

The use of a prime number greater than or equal to three for the number of single-port memory devices significantly reduces the likelihood of contention. For example, in the case that the number of simultaneous requests K=4 (as above), and if the spacing M is 1, then no contention occurs (e.g. if base address is 9, then the accessed addresses are 9, 10, 11, and 12, which can be seen to be on different single-port memory devices). Similarly, if the spacing M is 2, then no contention occurs (e.g. if base address is 9, then the accessed addresses are 9, 11, 13, and 15, which can be seen to be on different single-port memory devices). Likewise, for any other power of two spacing M (e.g. 4, 8 or 16), there is no contention.

In fact, contention is completely avoided for all regularly-spaced accesses, except where the spacing is equal to the prime number (e.g. five in the example of FIG. 3). Therefore, contention becomes much more unlikely when a prime number-based memory structure is used. The likelihood of contention can be reduced even further by selecting a prime number that is larger than any small integer spacing commonly used for DSP operations (such as multi-rate filtering). In one example, prime numbers greater than or equal to thirteen can be used, which has been found to perform well with real-life DSP data.

Figure 4:
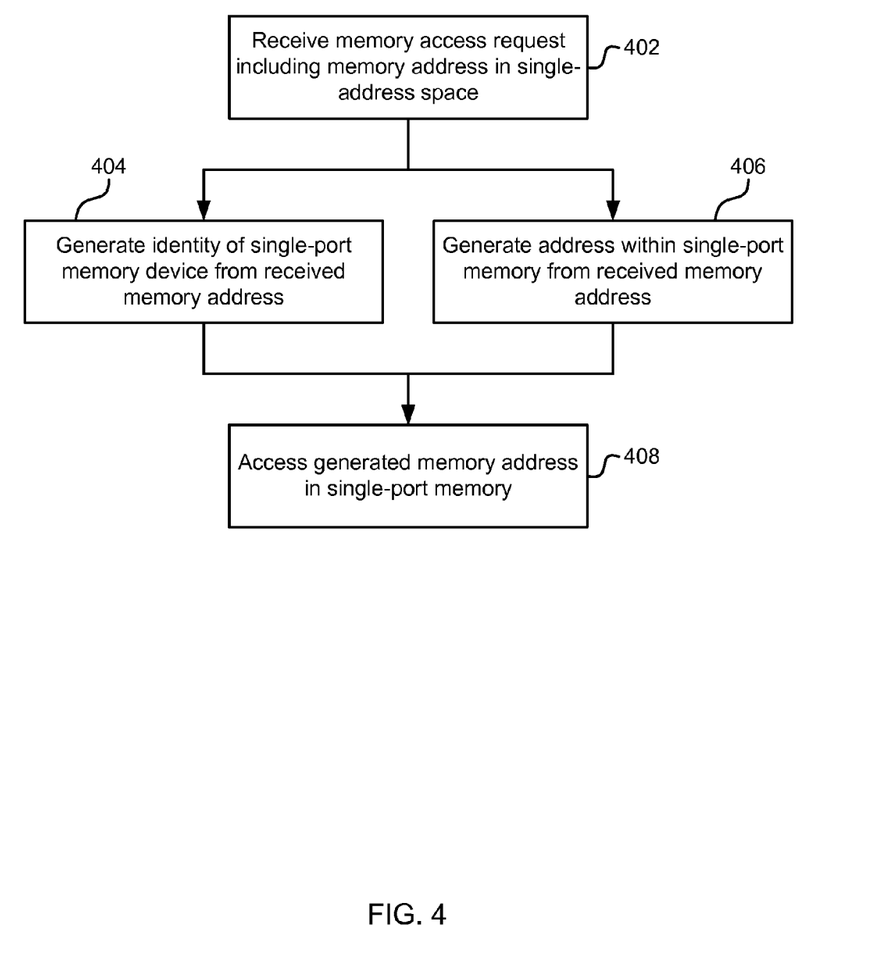
FIG. 4 illustrates a flow diagram of an address calculation method for a prime number of memory devices.

In order to perform the address conversion between the single address space and the single-port memory devices, a process such as that shown in FIG. 4 is performed. The address conversion cannot be performed simply by reading selected bits from the memory address, as was the case with FIG. 3 above. Nevertheless, an effective technique can be used.

FIG. 4 shows a flow diagram of an address calculation method for a prime number of memory devices. This can be performed by the memory interface 112 as described above. In step 402, a memory access request is received at a port, comprising a memory address in the single address space. Other requests can also be received at other ports concurrently with this and converted in the same way, but only one access request is considered in FIG. 4 for simplicity. A division operation is performed on the received memory address, using the total number of single-port memory devices (i.e. the prime number). The division operation has two parts. One part generates the identity of the single-port memory device corresponding to the requested memory address, in step 404. Another part generates the memory address within the single-port memory device corresponding to the requested memory address, in step 406.

The generation of the identity of the single-port memory device corresponding to the requested memory address in step 404 is performed by determining the modulo of the requested memory address in the single address space and the total number of single-port memories. In other words, the remainder of the division of the requested memory address and the prime number is found. For example, with reference to FIG. 3, if the requested memory address received at the port is 18, then the remainder of 18÷5 is 3. As can be seen, memory address 18 corresponds to Mem 3 208, as it is located in column 312.

The generation of the memory address within the identified single-port memory in step 406 is determined by calculating the quotient of the requested memory address in the single address space and the total number of single-port memories. In other words, the integer part of the result of dividing the requested memory address and the prime number is found. For example, with reference again to FIG. 3, if the requested memory address received at the port is 18, then 18÷5 is 3.6, and hence the quotient is 3. As can be seen, memory address 18 is located at memory address 3 in column 312 (counting downwards from zero).

Once the identity of the single-port memory device has been found in step 404, and the memory address within this single-port memory device has been found in step 406, then the memory interface 112 can access the data according to the request in step 408.

Although the operation described above is more complex than simply reading bits from a binary address, this can still be implemented efficiently in hardware, such that performance is not impeded in the conversion process. Regardless, the improvement in performance due to the lack of contention more than compensates for the increase in complexity of the address conversion.

The above-described multi-port memory structure, using a prime number of single-port memory devices, therefore provides an effective way of improving the performance of memory accesses in a digital signal processing system. This is particularly the case for a configurable digital signal processing system, where different types and structures of data can be processed by the same system. The use of the prime number of single-port memory devices minimises the risk of contention for all memory access patterns, except where the spacing matches the prime number.

In addition to providing fast memory access for SIMD operations, the multi-port memory structure described above can also be extended and used more widely in a configurable digital signal processing system. The number of access ports 106 provided by the multi-port memory can be extended such that several different processing elements in the digital signal processing system can all access the memory, and hence the multi-port memory device acts as a common shared memory space.

Figure 5:
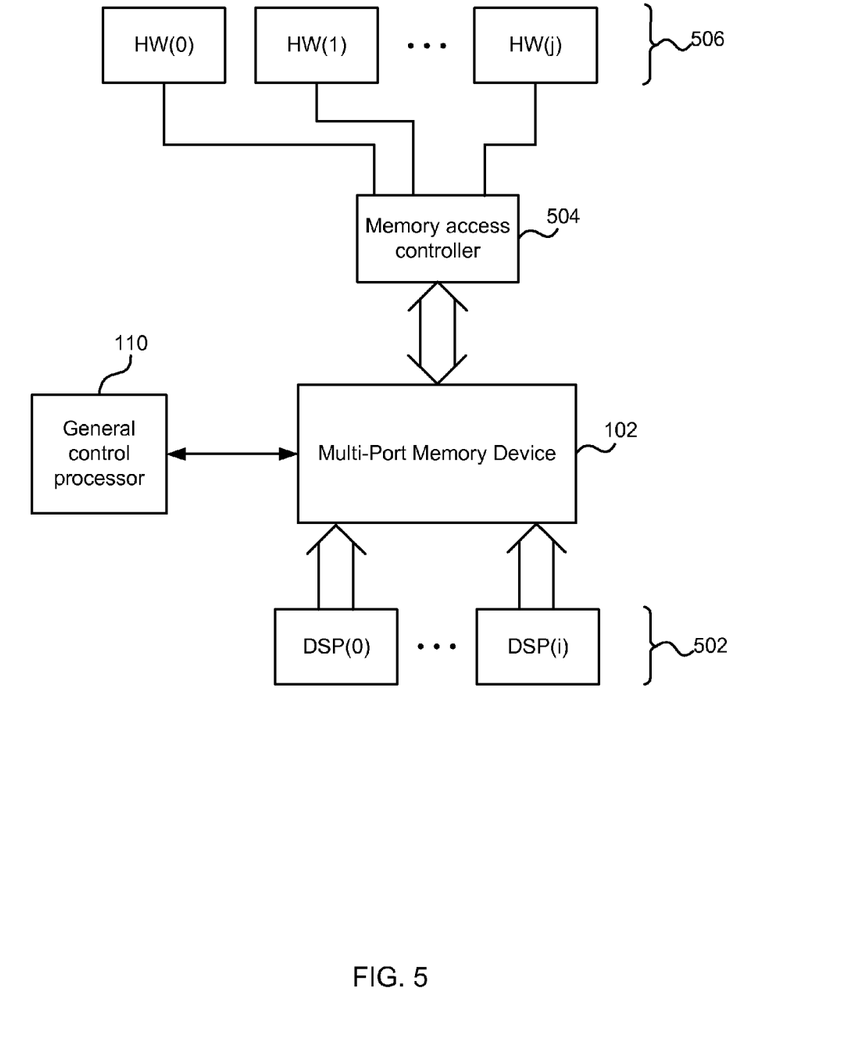
FIG. 5 illustrates a configurable digital signal processing system using the multi-port memory as a shared memory space.

An example of a digital signal processing system utilising the multi-port memory device as a common memory space is shown in FIG. 5. The system comprises the multi-port memory device 102, which is used for the storage of data. In the example of FIG. 5, the multi-port memory device 102 can be used to store both data being processed and configuration data/code for operating the digital signal processing system.

Connected to the multi-port memory device 102 are one or more digital signal processors 502. The DSPs 502 are processors that are programmable to perform signal processing calculations on data, such as, for example, fast fourier transforms, filtering and equalisation. DSP 108 from FIG. 1 is an example of such a DSP. One or more of the DSPs 502 can be SIMD processors that access more than one item of data at the same time, as described above. Whilst not considered general-purpose processors, the DSPs 502 are more configurable than the hardware peripherals described below. The DSPs 502 execute program code/instructions to read data from the multi-port memory device 102, perform signal processing operations on the data, and write data back to the multi-port memory device 102.

Also connected to the multi-port memory device 102 is a memory access controller 504, which provides access to the multi-port memory device 102 for a plurality of hardware peripherals 506. In some examples, the memory access controller 504 can be in the form of a direct memory access (DMA) controller. The memory access controller 504 provides a plurality of memory access channels (e.g. DMA channels) that can be used by the hardware peripherals 506 to enable the reading or writing of data from or to the multi-port memory device 102.

The hardware peripherals 506 are specialised, dedicated hardware blocks that are configured to perform a particular signal processing task. For example, one hardware peripheral may be a specialised Viterbi decoding block, and another one may be a specialised deinterleaving block. The hardware peripherals may also be known as accelerators. Each of the hardware peripherals operates independently of each other. The hardware peripherals may be sufficiently configurable to be provided with operational parameters specific to their task, but they are not sufficiently configurable to change their task (e.g. a Viterbi block cannot be reconfigured as a deinterleaving block). Therefore, the hardware peripherals are more specialised to a particular task than the DSPs 502. However, the hardware peripherals are arranged to perform their specialised tasks in a very rapid and efficient manner.

Also connected to the multi-port memory device 102 is a general control processor 110 (as also shown in FIG. 1), which can be used to initialise, configure and control the operation of the digital signal processing system.

The digital signal processing system described above provides flexibility in the signal processing operations. For example, the system can be arranged to operate such that the different DSPs 502 and hardware peripherals 506 process the data in any desired configuration or sequence. Each hardware peripheral or DSP can operate on one or more blocks of data (also referred to herein as a buffer of data) provided by other parts of the system and stored in the common memory space provided by the multi-port memory device 102, and generates and stores one or more buffers of data to be used by other elements of the system. This enables the digital signal processing system to be used for a variety of different types of signal, e.g. for different broadcast/telecommunication standards.

The multi-port memory device 102 can be configured such that access ports are provided for each of the DSPs 502, the memory access controller 504 and the general control processor 110. This was partially illustrated in FIG. 1, which shows one DSP 108 and the general control processor 110 each connected to ports of the multi-port memory device 102 (further processing elements can also be connected to further ports of multi-port memory device 102 not shown in FIG. 1). Providing ports for the processing elements of the digital signal processing systems enables them to independently access the data on the memory. This can also be performed concurrently in the case where contention for one of the single-port memory devices does not occur.

The use of a common memory space provided by the multi-port memory device 102 also enables the total amount of memory storage provisioned in the digital signal processing system to be reduced. Without the use of a common memory space, each processing element is provided with its own, dedicated memory. For example, each of the DSPs 502 may have their own workspace memory, the general control processor 110 has another separate memory for storing execution code and data, the hardware peripherals 506 have separate input and output buffers, and one or more additional memories may be used for exchanging data between the processing elements.

Because the digital signal processing system is configurable for use with a number of different standards, each of these separate memories need to be separately dimensioned for the particular standard that has the largest demand on any given memory. In other words, the DSP memory needs to be large enough to accommodate the standard that has the largest demands on DSP memory. Similarly, the hardware peripheral buffers need to be large enough to accommodate the standard with the highest demands on hardware peripheral buffers (which may be different to the standard with high DSP memory demands). As a result of this, significant amounts of memory are generally unused by some of the processing elements.

However, if a common memory space is provided by the multi-port memory device 102, then the memory requirements of the different standards as a whole can be taken into account (rather than their requirements on individual elements of the system). In other words, the multi-port memory device 102 needs to be large enough to accommodate the largest overall, total memory demands of the standards. This has the effect of averaging the differing memory requirements between the standards (e.g. one might need more DSP memory, but smaller buffers, whereas another may be the opposite). This has the effect of requiring a significantly lower amount of overall memory, and hence saves silicon area.

The common memory space provided by the multi-port memory device 102 can therefore hold all the different types of data used by the system, such as digital signal processor workspaces, execution code and data for general control processor, input and output buffers for one or more of the hardware peripherals, one or more buffers for exchanging data between processors, as well as other configuration data for the digital signal processing system.

When the multi-port memory device 102 is operating as a common memory space, more processing elements can be attempting to access the memory at the same time. In order to prevent this resulting in a larger number of contentions for the memory that degrade the system performance, a prioritisation mechanism can be provided. The prioritisation mechanism can allocate a priority value to each access port of the multi-port memory device 102, such that if two access requests are received at the same time that result in contention, then the request that is received at the port with the higher priority value is served first, and the request at the other ports waits until this has completed.

In one example, the priority values allocated to the ports can be based on the location of the port in the multi-port memory structure. For example, each port is given an identity from zero to n-1, where n is the number of ports present (as illustrated in FIG. 1). The priority mechanism can then be based on the port identity, such that the port with the lowest (or alternatively highest) identity is given priority in the case of contention. This provides a priority mechanism that can be very efficiently and simply implemented at the memory interface, and which does not require significant execution time to resolve. In one example, the SIMD processors can be connected to the lowest numbered ports, so that these have priority memory access over other elements of the system. Alternatively the priority of each port may be configured for example through writing to control registers such that the ports connected to processing elements with the most time critical operations receive the highest priority.

In some examples, the loss of performance arising from contention can be further mitigated by various techniques such as prioritising read requests over write requests and introducing some pipeline buffering into the memory interface such that a request that suffers contention on one clock cycle may be serviced on a following clock cycle without causing the requesting device to halt its operation. Memory access performance can also be enhanced in some examples by enabling a fast return of data being read from a memory location that was written to by a preceding write access. This enhancement improves performance by eliminating the requirement to physically read the memory location, and can reduce latency.

The term "processor" and "computer" is used herein to refer to any device, or portion thereof, with processing capability such that it can execute instructions. Those skilled in the art will realize that such processing capabilities are incorporated into many different devices and therefore the term "computer" includes set top boxes, media players, digital radios, PCs, servers, mobile telephones, personal digital assistants and many other devices.

Those skilled in the art will realize that storage devices utilized to store program instructions or data can be distributed across a network. For example, a remote computer may store an example of a process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to an item refers to one or more of those items. The term "comprising" is used herein to mean including the method blocks or elements identified, but that such blocks or elements do not comprise an exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of the examples.

The invention claimed is:

1. A digital signal processing system, comprising: a plurality of single-port memory devices;
   a memory interface connected to the plurality of single-port memory devices and comprising a plurality of access ports, wherein the memory interface is arranged to provide access to the plurality of single-port memory devices through each access port using a single address space; and
   a processor having a plurality of data connections that couple the processor to at least two of the access ports and arranged to access a respective different memory address from the single address space substantially simultaneously from each of the data connections when executing an operation defined by a single instruction, wherein the total number of single-port memory devices connected to the memory interface is a prime number greater than or equal to three.

2. A digital signal processing system according to claim 1, wherein the prime number is greater than or equal to five.

3. A digital signal processing system according to claim 1, wherein the prime number is greater than or equal to thirteen.

4. A digital signal processing system according to claim 1, wherein the operation executed by the processor is a fast fourier transform operation or a multi-rate filtering operation.

5. A digital signal processing system according to claim 1, wherein the different memory addresses accessed substantially simultaneously are regularly spaced apart according to a predefined relationship.

6. A digital signal processing system according to claim 5, wherein the predefined relationship regularly spaces the different memory addresses apart by a value of: one or a power of two.

7. A digital signal processing system according to claim 1, further comprising at least one of a control processor and a hardware peripheral connected to one or more of the access ports, and arranged to access data stored on one or more of the plurality of single-port memory devices using the single address space.

8. A digital signal processing system according to claim 1, wherein each of the access ports are allocated a priority value, and the memory interface is arranged to prioritise access requests received at a first access port over a second access port in the case of contention based on the respective priority value.

9. A digital signal processing system according to claim 1, wherein each of the access ports are allocated a sequential identifier, and the memory interface is arranged to prioritise access requests received at a first access port over a second access port in the case of contention based on the respective sequential identifiers.

10. A digital signal processing system according to claim 9, wherein the memory interface is arranged to prioritise access requests received at the first access port over the second port if the first port has a lower sequential identifier.

11. A digital signal processing system according to claim 1, wherein the memory interface comprises a first-in first-out buffer for each access port arranged to queue access requests in the order in which they are received.

12. A digital signal processing system according to claim 1, wherein the total number of access ports provided by the memory interface is less than the total number of single-port memory devices connected to the memory interface.

13. A digital signal processing system according to claim 1, wherein the single-port memory devices are configured to store at least one of: a digital signal processor workspace; configuration data for the digital signal processing system; execution code and data for a control processor; input and output buffers for one or more hardware peripherals; and one or more buffers for exchanging data between processors.

14. A method of accessing data in a digital signal processing system, comprising:
    receiving one or more memory access requests from a processor at a memory interface, the one or more requests being for a plurality of elements of a vector of data to be used by the processor in performing an operation specified by a single instruction, the one or more the requests defining comprising a plurality of memory addresses in a single address space from which the plurality of elements are to be retrieved, wherein the processor is coupled to a plurality of ports of the memory interface; generating, from each memory address of the plurality of memory addresses:
    a respective identifier of one single-port memory device from a plurality of single-port memory devices connected to the memory interface and a respective second memory address within the one single-port memory device; and
    accessing data located at each of the second memory addresses within the elle single-port memory devices for the plurality of memory addresses substantially simultaneously,
    wherein the step of generating comprises performing a division operation using the total number of single-port memory devices connected to the memory interface, and wherein the total number of single-port memory devices connected to the memory interface is a prime number greater than or equal to three.

15. A method according to claim 14, wherein the step of generating an identifier of one single-port memory device comprises determining the modulo of the memory address in the single address space and the total number of single-port memory devices connected to the memory interface.

16. A method according to claim 14, wherein the step of generating the second memory address comprises determining the quotient of the memory address in the single address space and the total number of single-port memory devices connected to the memory interface.

17. A method according to claim 14, wherein the access request is a received via a first port of a plurality of ports provided by the memory interface.

18. A method according to claim 17, further comprising the steps of:
    receiving a further access request from a further processor of the memory interface via a second port;
    determining that both the access request and the further access request cannot be served simultaneously;
    comparing a priority rating allocated to the first port to a priority rating allocated to the second port; and
    selecting to serve the access request received via the first port based on the priority rating comparison.

* * * * *